United States Patent
Havemose

(10) Patent No.: US 7,010,792 B1
(45) Date of Patent: Mar. 7, 2006

(54) METHOD FOR MANAGING INTERACTION BETWEEN INFORMATION APPLIANCES AND APPLIANCE SERVICES

(75) Inventor: Allan Havemose, San Jose, CA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/542,716

(22) Filed: Apr. 4, 2000

Related U.S. Application Data

(63) Continuation-in-part of application No. 09/312,123, filed on May 14, 1999, now Pat. No. 6,757,903.

(60) Provisional application No. 60/127,767, filed on Apr. 5, 1999.

(51) Int. Cl.
 *G06F 3/00* (2006.01)

(52) U.S. Cl. .......................... 719/316; 709/201; 705/40

(58) Field of Classification Search ................ 709/201, 709/203, 217–219, 223, 230, 231; 705/40; 713/155, 200–202; 718/100, 104; 719/310, 719/313, 315–316, 330
See application file for complete search history.

(56) References Cited

U.S. PATENT DOCUMENTS

| | | | | |
|---|---|---|---|---|
| 5,511,197 A | * | 4/1996 | Hill et al. | 719/328 |
| 5,689,644 A | * | 11/1997 | Chou et al. | 370/392 |
| 5,727,145 A | * | 3/1998 | Nessett et al. | 713/200 |
| 5,832,209 A | * | 11/1998 | Krantz | 713/201 |
| 5,862,325 A | * | 1/1999 | Reed et al. | 709/201 |
| 6,098,056 A | * | 8/2000 | Rusnak et al. | 705/75 |
| 6,135,646 A | * | 10/2000 | Kahn et al. | 709/217 |
| 6,185,609 B1 | * | 2/2001 | Rangarajan et al. | 709/219 |
| 6,219,790 B1 | * | 4/2001 | Lloyd et al. | 713/201 |
| 6,223,292 B1 | * | 4/2001 | Dean et al. | 713/202 |
| 6,385,651 B1 | * | 5/2002 | Dancs et al. | 709/227 |
| 6,385,729 B1 | * | 5/2002 | DiGiorgio et al. | 713/201 |
| 6,460,141 B1 | * | 10/2002 | Olden | 713/201 |
| 6,510,236 B1 | * | 1/2003 | Crane et al. | 382/116 |

* cited by examiner

Primary Examiner—Meng-Al T. An
Assistant Examiner—George Lawrence Opie
(74) Attorney, Agent, or Firm—Kerri Kuenzli Bradley; Suiter West Swantz PC LLO

(57) ABSTRACT

The present invention provides a universal information appliance management system capable of executing transactions, including financial transactions, across a distributed network. Additionally, the present invention provides central authentication of objects of the system such that one object may verify the validity of any other object.

8 Claims, 9 Drawing Sheets

METHOD FOR MANAGING INTERACTION BETWEEN INFORMATION APPLIANCES AND APPLIANCE SERVICES

CROSS REFERENCE TO RELATED APPLICATIONS

The present application claims the benefit under 35 U.S.C. § 119(e) of U.S. Provisional Patent Application Ser. No. 60/127,767 filed on Apr. 5, 1999. Said U.S. Provisional Application 60/127,767 is herein incorporated by reference in its entirety. The present application is a continuation-in-part of and also claims the benefit under 35 U.S.C. § 120 of U. S. patent application Ser. No. 09/312,123, filed May 14, 1999 which is now U.S. Pat. No. 6,757,903. Said U.S. Pat. No. 6,757,903 is herein incorporated by reference in its entirety. The present application also incorporates the following applications by reference in their entirety: U.S. patent application Ser. No. 09/542,559, filed Apr. 4, 2000 which is now U.S. Pat. No. 6,832,377; U.S. patent application Ser. No. 09/542,159, filed Apr. 4, 2000 which is now U.S. Pat. No. 6,880,157; U. S. patent application Ser. No. 09/542,714, filed Apr. 4, 2000 which is now U.S. Pat. No. 6,842,894; and U.S. patent application Ser. No. 09/542,743, filed Apr. 4, 2000.

FIELD OF THE INVENTION

The present invention relates generally to the fields of transaction control, and more specifically to methods and apparatus for implementing business process features over a network of digital information appliances, networked computers/devices, and conventional computers.

BACKGROUND OF THE INVENTION

Methods and apparatus for transacting business over a network are old in the art. For example, telephone communications have long been utilized to transact purchases and transfer funds between accounts. Likewise, current cable and satellite television systems allow viewers to order video and audio content paid for via a viewer's credit or debit account information. Additionally, "on-line" purchases of goods and services are becoming common over the INTERNET. However, such methods and apparatus do not allow a buyer and a seller to transact business utilizing a common or universal transaction system.

Digital information appliances (DIA) include electronic devices designed to perform a specific function or group of functions more efficiently than would a conventional computer system. Like computer systems, information appliances may be interconnected with a network such as the INTERNET to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programming methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory.

Consequently, it would be advantageous to develop an information appliance management system employing a standard appliance system architecture. Such an information appliance management system would provide greater fault tolerance than conventional object based architectures, and may be implemented on thin appliances having a limited amount of memory. The information appliance management system would allow management of transactions performed through information appliances.

Additionally, users may be wary of entering personal information onto the Internet, especially if the user must re-enter the information for every resource to be utilized. Additionally, the content requested by the user may require a minimal fee that may actually be less than the transaction costs for processing the particular fee. This may result in an inefficiency wherein the provider may either lose money by offering the resources at a price below the cost of performing the transaction or the price may be prohibitive to the point that the consumer may not choose to utilize the resource at all. The cost for processing that transaction by a credit company and the resource provider may well be more than the original dollar charged for the transaction. This method is time consuming and results in fewer users utilizing the system. Therefore, it would be advantageous if such transaction management would allow content/service providers to control distribution of the content or services they provide and would include novel features such as central authentication of objects.

SUMMARY OF THE INVENTION

Accordingly, the present invention is directed to a system and method of central authentication. In a first aspect of the present invention, a business process feature for providing user authentication in an information appliance network, includes providing user authentication information to an authentication resource, the user authentication information accessible by providers of resources via the information appliance network. Resource provider authentication information is also provided to an authentication resource, the resource provider information accessible by resource users via the information appliance network. Authentication of at least one of a provider resource and a user resource is requested such that authentication information is automatically exchanged between the provider resource and the resource request before resource sharing occurs between information appliances connected to the information appliance network.

In a second aspect of the present invention, a method for managing the interaction between a plurality of information appliances and a plurality of appliance services, the information appliances being removably connected to the appliance services through a network, the method includes receiving an appliance service request from an information appliance having an appliance type and an appliance identifier. The request is tested to determine whether the information appliance is registered. The request is also tested to determine whether the appliance identifier is authorized to receive a service from a requested appliance service. Services for the information appliance from the requested appliance service are then authorized.

In a third aspect of the present invention, a method for managing the interaction between a plurality of information appliances and a plurality of appliance services, said information appliances being removably connected to said appliance services through a network, the method includes transmitting an authentication interface dynamic base object to a content provider information appliance from a user information appliance. The authentication interface dynamic base object is received by the content provider information appliance and the authentication interface dynamic base object is verified through a central authenticator, wherein the authentication interface dynamic base object passes verification to an authentication implementation dynamic base object, the authentication implementation dynamic base object including user authentication information.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention includes a system architecture and operating environment for digital information appliances (DIAs) which allows for feature and feature enhancements for digital information appliances and the like. A DIA is any electronic device capable of operating on a computer network in batch or real-time. Most DIA's include an I/O, a ROM, and a memory. DIAs include both single feature and multiple feature devices. In a preferred embodiment, DIAs operate in the network of the present environment with general purpose computers and the like (FIG. 1).

Figure 1:
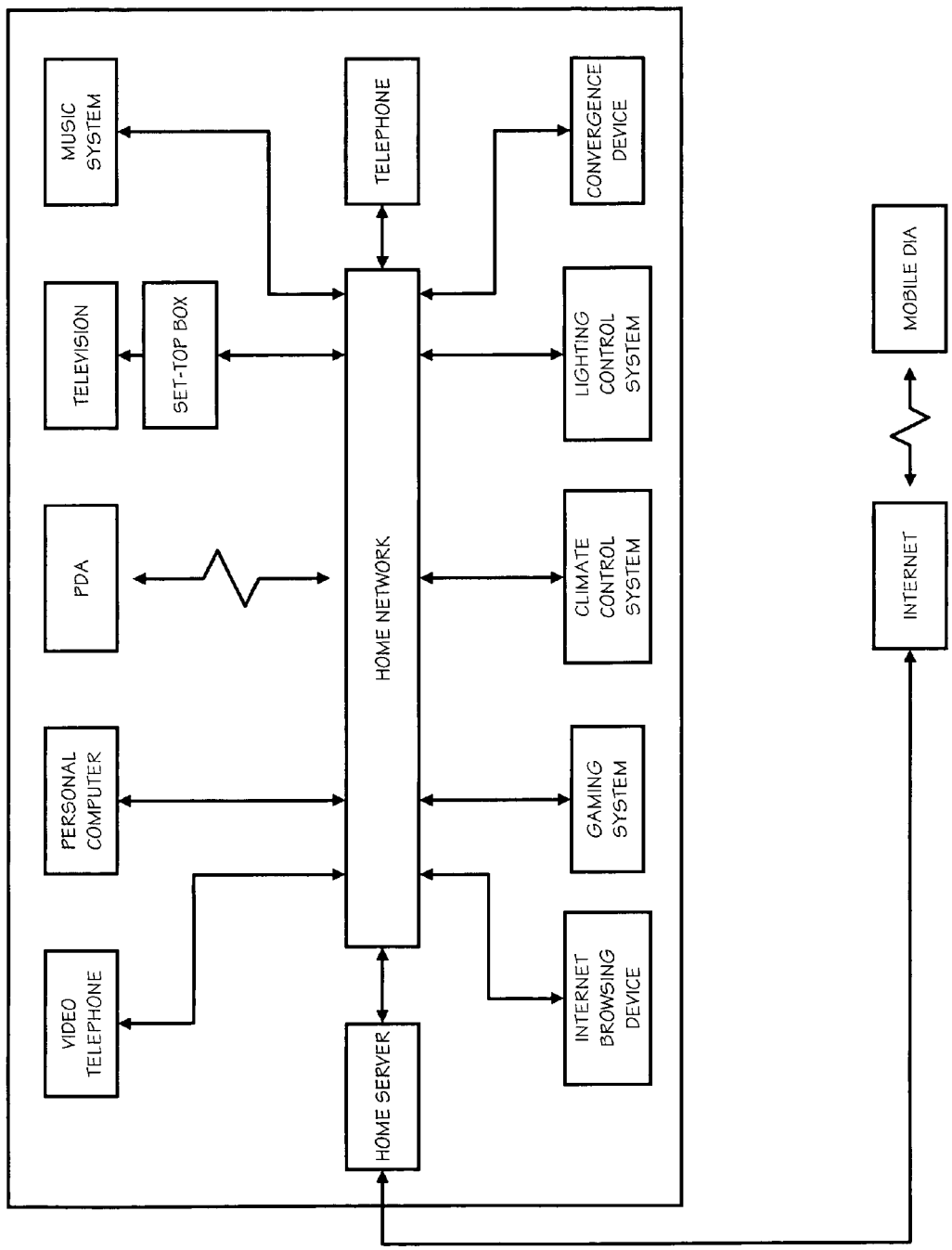
FIG. 1 is a block diagram illustrating a network of information appliances having a local and a global portion operated at least partially by the architecture of the present invention.

Referring generally now to FIGS. 1 through 5, a system architecture and operating environment for digital information appliances (DIAs) which allows for feature and feature enhancements for digital information appliances and the like is shown. A DIA is any electronic device capable of operating on a computer network in batch or real-time. Most DIA's include an I/O, a ROM, and a memory. DIAs include both single feature and multiple feature devices, such as information handling systems. In a preferred embodiment, DIAs operate in the network of the present environment with general purpose computers and the like (FIG. 1).

System Architecture and Operating Environment

To best understand the many novel and innovative features of the universal information appliance management system of the present invention, a discussion of an exemplary underlying system architecture and operating environment is in order. While the patentable features of the present system architecture and operating environment (as claimed herein) will be apparent, other object based or procedural architectures may be utilized to implement the information appliance management system of the present invention.

An object based implementation is described in the preferred embodiment, however those skilled in the art will recognize that the architecture, including a functional hierarchy and an administration function, could be implemented in a procedural implementation without departing from the spirit of the invention.

Figure 2:
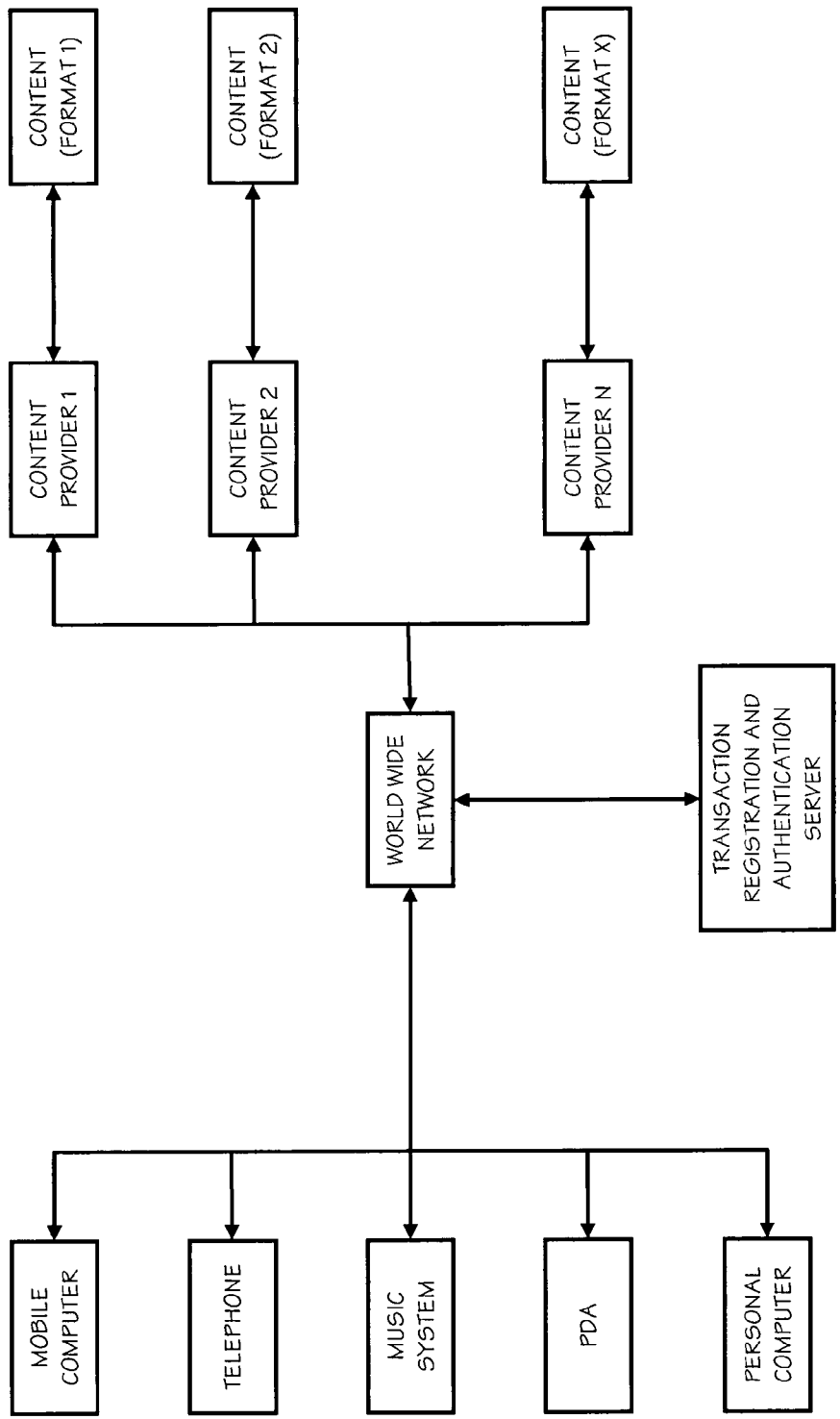
FIG. 2 is a block diagram illustrating content exchange between computers and information appliances over a network at least partially operated by the architecture of the present invention.

The system architecture and operating environment of the present invention (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

Dynamic Base-Objects

The architecture of the present invention also enables efficient development of applications; whether work processors (e.g., word processors), video applications, games or soft appliances. The architecture of the present invention includes dynamic base-objects (DBO). Each DBO implements a defined behavior, but may in addition request and use capabilities of another DBO. DBOs may also provide services to another object such as a DBO requesting another DBO.

Figure 3:
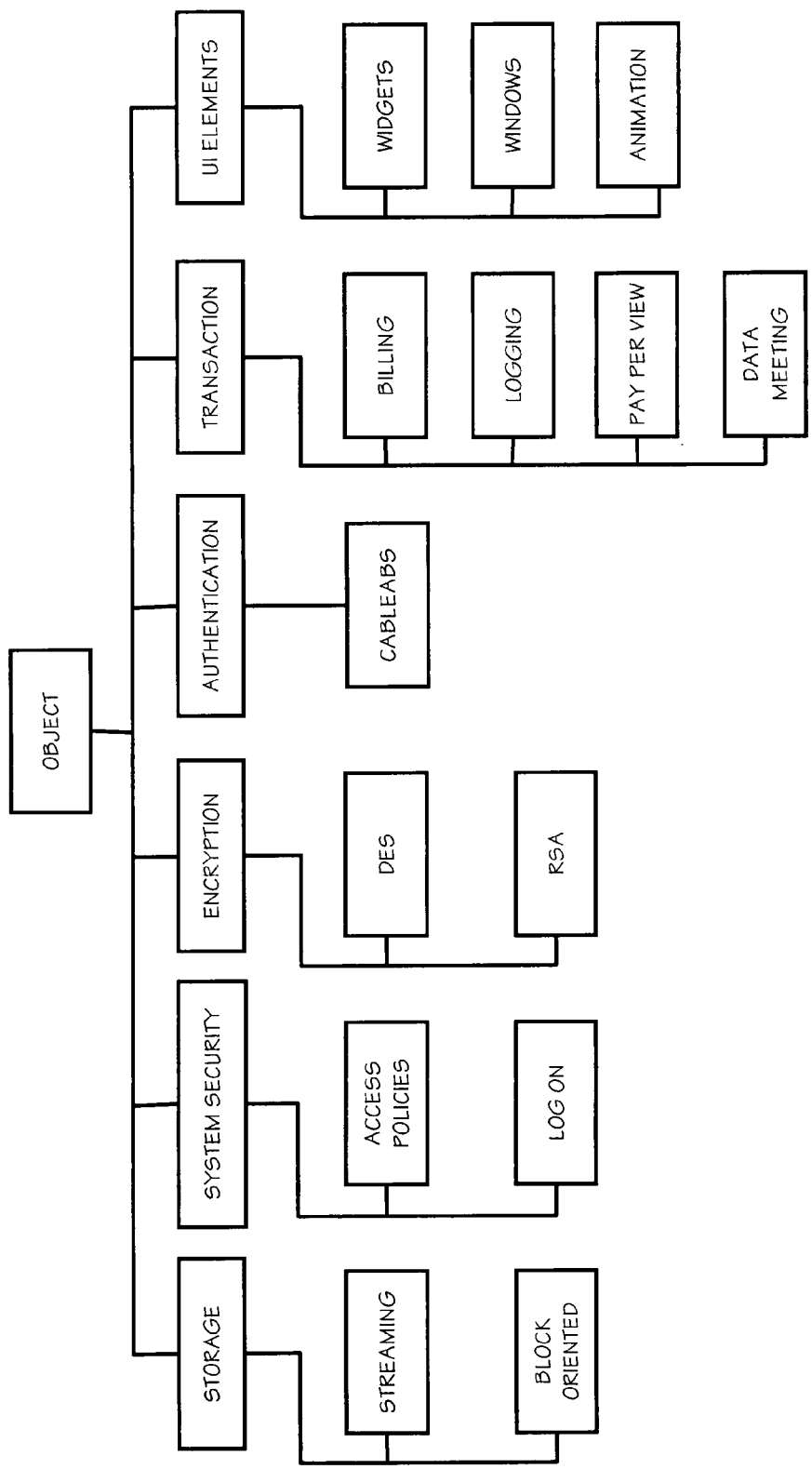
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming.

Figure 4:
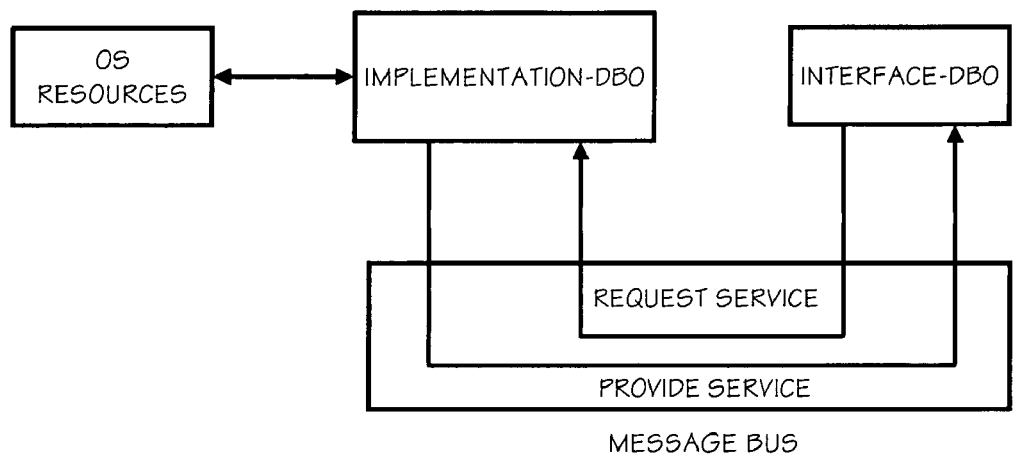
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
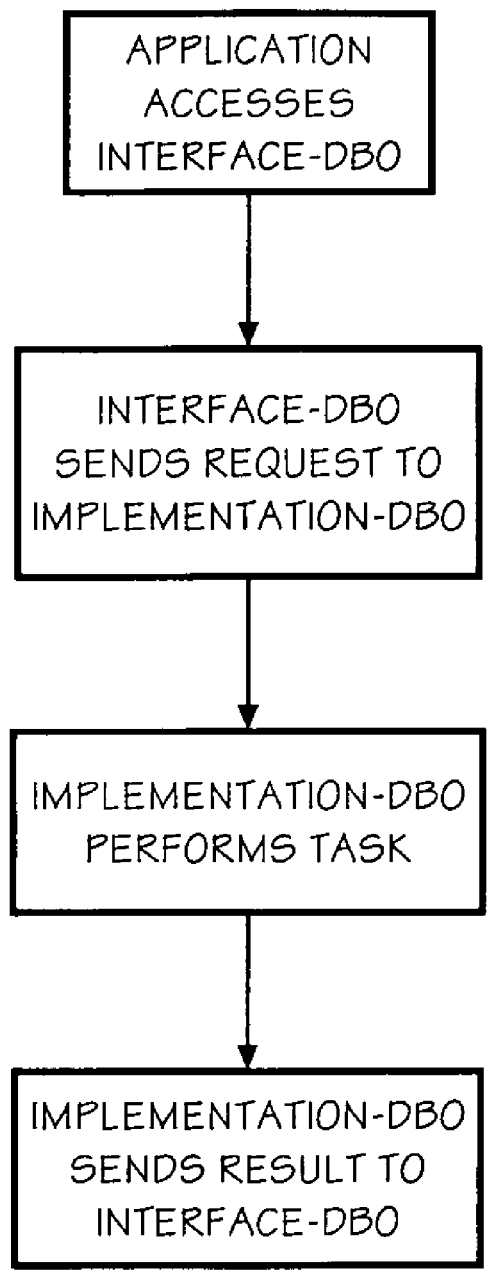
FIG. 5 is a flow diagram illustrating the operation of interface-DBOs and implementation-DBOs for providing architecture features and capabilities within the architecture of the scalable, distributed network of the present invention.

In an exemplary embodiment of the architecture of the present invention when an application, for example, creates a DBO, two DBOs are actually created. These two DBOs are an interface-DBO within the application, and an instance of the real DBO (a/k/a an implementation-DBO). This relationship is best illustrated in FIG. 4. In a preferred embodiment of the invention, each time the application uses the interface-DBO, a message is sent to the implementation-DBO, which carries out the task and returns the result, as shown in FIG. 5. When the application frees the DBO the reverse happens. The implementation-DBO gets a message call to de-allocate its resources and terminate.

In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a preferred embodiment, DBOs have the following "behavioral" characteristics: (1) capability or feature may be dynamically created, added and changed; (2) other objects including other DBOs may provide a DBO with additional capabilities or features; (3) self checking mechanism with dynamic re-start and re-initialization upon runtime or like failure (4) standardized communication and services interface (e.g., object-to-object, user-to-object, and object-to-user); and (5) fully thread-safe.

Central Authentication

Users may be wary of entering personal information onto the Internet, especially if the user must re-enter the information for every resource to be utilized. Additionally, the content requested by the user may require a minimal fee that may actually be less than the transaction costs for processing the particular fee. This may result in an inefficiency wherein the provider may either lose money by offering the resources at a price below the cost of performing the transaction or the price may be prohibitive to the point that the consumer may not choose to utilize the resource at all. For example, if a user desired to download a particular section of a newspaper, such as one article, the cost for acquiring that article might be one dollar, even though the cost to purchase the original newspaper as issued was 50 cents. To purchase that article for a dollar, the user must enter purchase information, such as a credit card number, expiration date of the credit card, and the like. The cost for processing that transaction by the credit card company and the resource provider may well be more than the original dollar charged for the transaction. This method is time consuming and results in fewer users utilizing the system. The present invention addresses these problems by performing and/or verifying transactions at a centralized location. For example, a transaction-DBO may certify a user so as to enable the transaction to be performed, such as indicated that the user has the required funds, or by virtue of creating virtual money that may be redeemed at another location for actual money, and the like.

Figure 6:
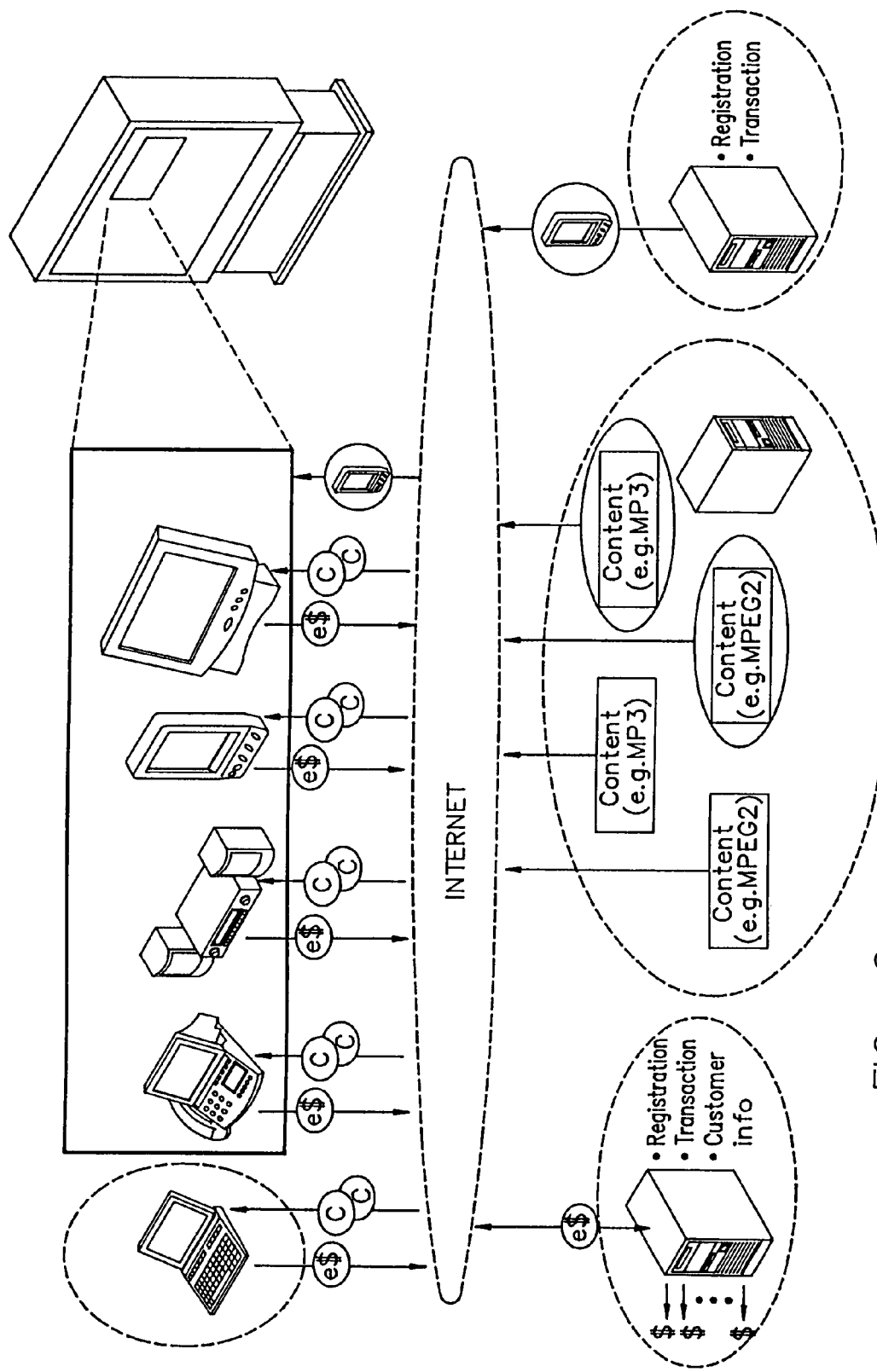
FIG. 6 is a block diagram illustrating an exemplary central authentication within the architecture of the scalable, distributed network of the present invention wherein a virtual appliance provider is included.
Figure 7:
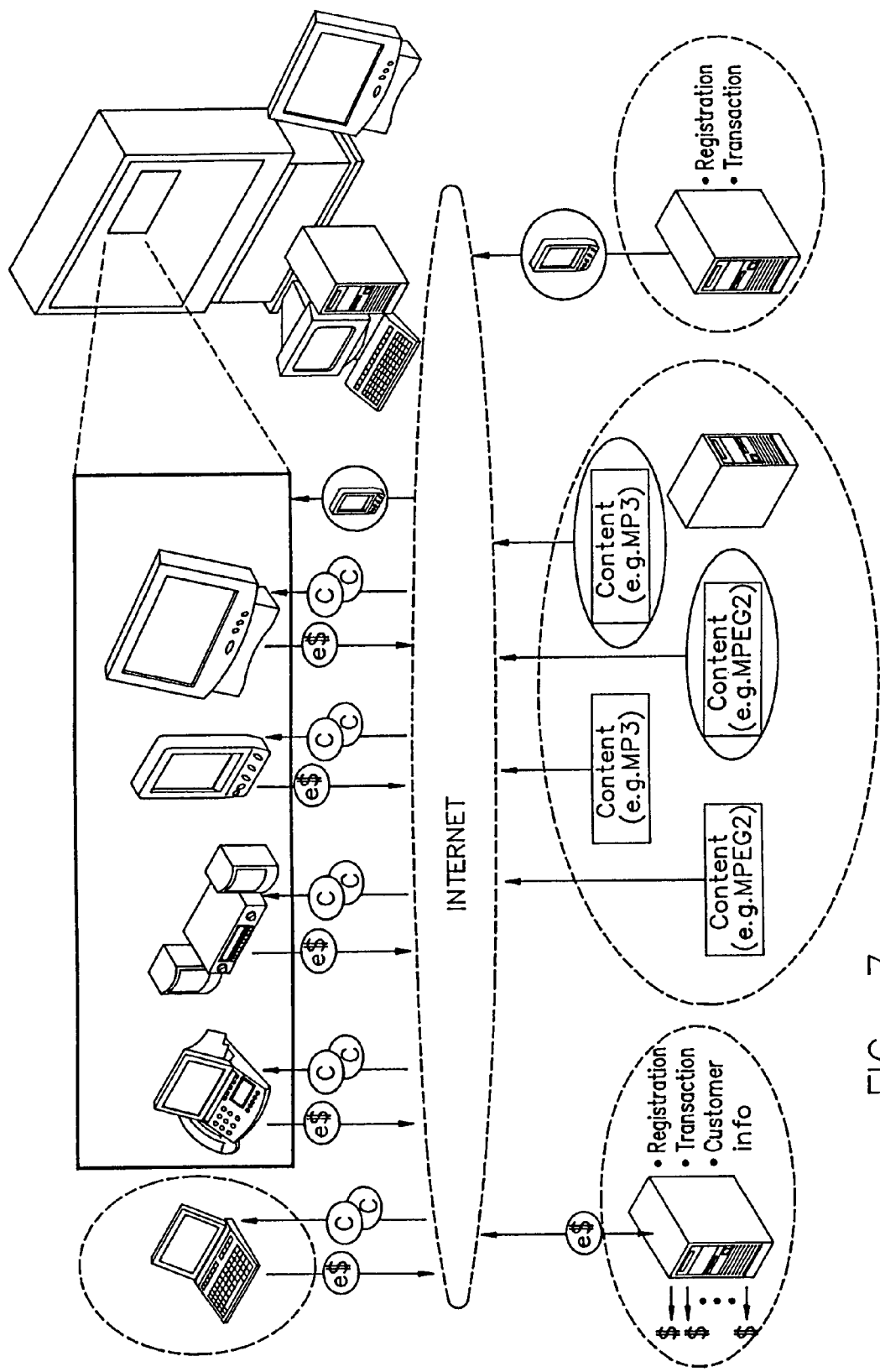
FIG. 7 is a further block diagram illustrating central authentication within the architecture of the scalable, distributed network of the present invention wherein a computing device resource provider is included.

Referring now to FIGS. 6 and 7, exemplary embodiments are shown wherein a central authenticator may be utilized to act as a clearinghouse to facilitate transactions over the Internet. For example, a user may enter relevant purchasing information at a central location, so as to create a type of account. When the user desires a transaction to be performed, such as the purchase of content from a provider, the provider may embed a transaction-DBO so as to facilitate the purchase of that content by the user. The purchase of the information may be dynamic and flexible. In other words, if a provider desired to charge per page of content, notes in a song, time allowed for use (such as rental of a movie), and the like, these charges may be cleared through the centralized account. Additionally, the process of performing the transaction may be flexible and dynamic. For instance, the user may utilize a device that contains a transaction-DBO. The transaction-DBO may batch the totals of smaller transactions for later transmittal, or may update a central account per continued usage, such as continued playing of a song wherein the user is billed each time the song is played. Whatever sort of variable or method the user or provider may desire to apply may be implemented by use of central authentication.

Furthermore, the use of central authentication may provide an increased sense of privacy over the Internet. Fear of sharing personal information over the Internet may have an adverse affect on the ability of providers to market and sell their resources. By allowing a user to enter the billing information at one location, the user may prevent having to provide a credit card number for every transaction performed. Central authentication may work to facilitate the transaction by certifying that the particular account contains sufficient funds, or even deny the transaction because those types of transactions are not permitted per the user of the account, and the like. For example, central authentication may be utilized to confirm the identity of the user, thereby permitting and/or denying access by that user to certain resources.

Figure 8:
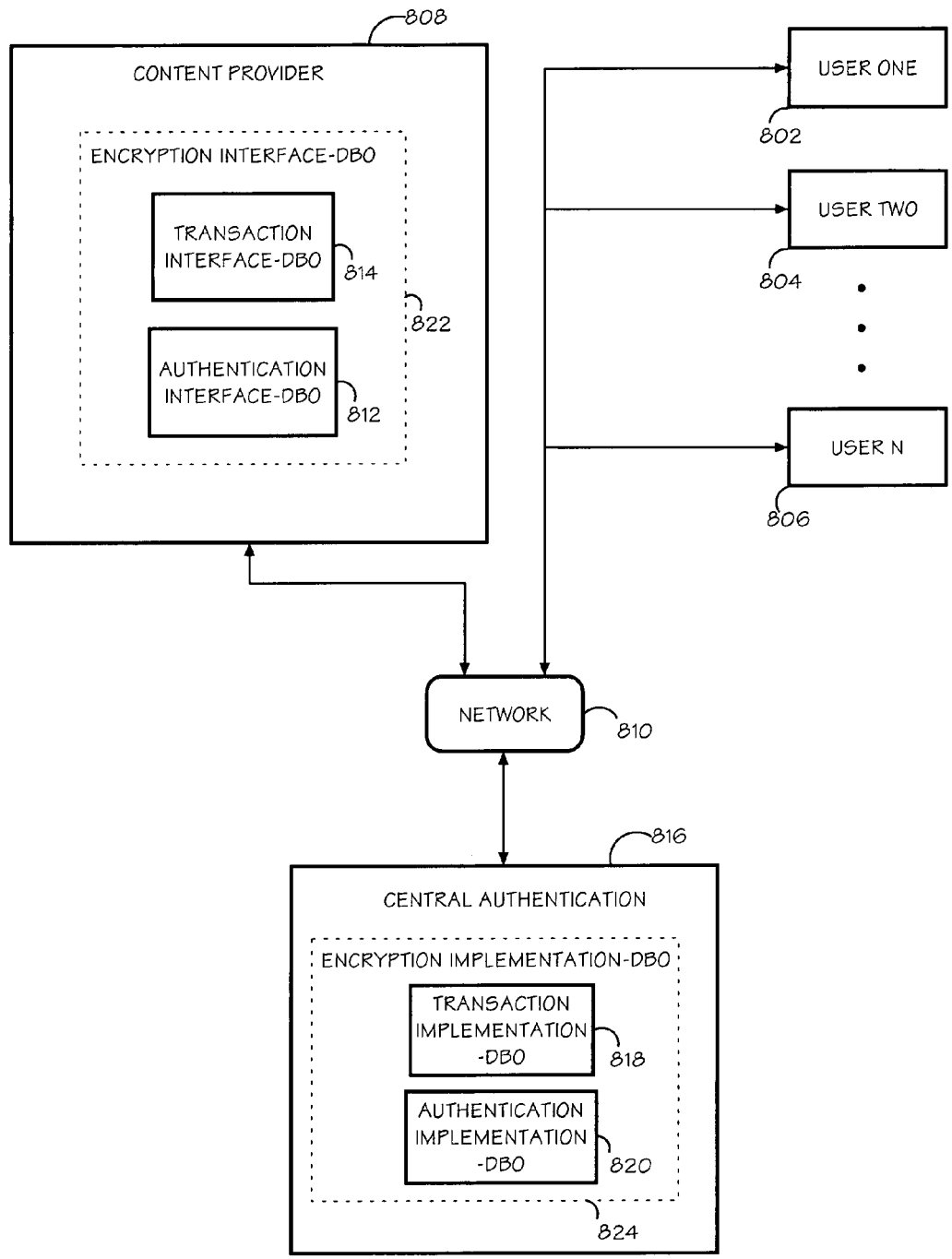
FIG. 8 is a block diagram depicting an exemplary embodiment of the present invention wherein central authentication utilizing authentication, transaction and encryption dynamic base objects over a network is shown.

For example, as shown in FIG. 8, a plurality of users 802, 804, and 806 may access a content provider 808 over a network 810. A user desiring access to specific content may provide an authentication interface dynamic base object 812 to the provider 808 to give the provider access to central authentication information of the user. The content provider 808 may utilize the authentication interface dynamic base object 812 with a transaction interface dynamic base object 814 to access the user's information contained in the central authentication repository 816 over the network 810 and to charge the user's account for access to the content. The necessary transactions and data manipulation may be performed by the transaction implementation dynamic base object 818 and the authentication implementation dynamic base object 820. In this way, the content provider may seamlessly access the user's information without requiring the user to provide oftentimes sensitive information. It may be preferable to utilize an encryption dynamic base object 822 and 824 to protect transmittal of the transaction interface dynamic base object 814 and authentication interface dynamic base object 812 over the network 810.

Figure 9:
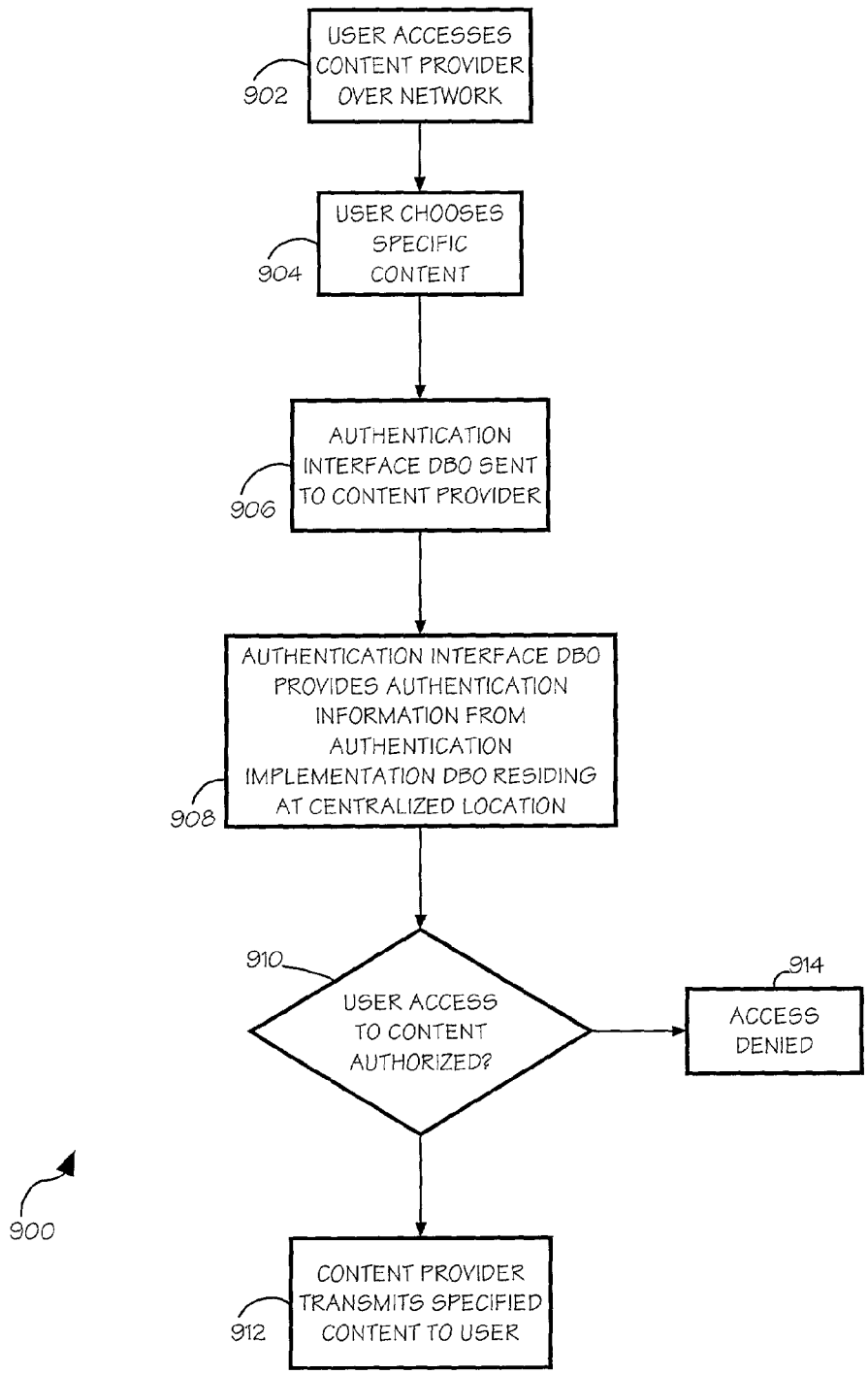
FIG. 9 is a flow diagram depicting an exemplary method of central authentication of the present invention.

Referring now to FIG. 9, an exemplary method 900 of the present invention is shown. A user may access a content provider over a network 902 and choose specific content 904. An authentication interface dynamic base object is sent to the content provider by the user 906. The authentication interface dynamic base object provides authentication information from an authentication implementation dynamic base object residing at a centralized location 908. If the authentication implementation dynamic base object verifies 910 that the user has access to the content, the content provider may transmit the specified content to the user 912. However, if the implementation dynamic base object restricts the user from having access to the content 914, the authentication implementation dynamic base object may prompt the user for additional information, such as an alternate method of payment, and the like.

For instance, as a user implements an interface-DBO for the purchase of a movie, the movie-DBO may contain a transaction-DBO further containing centralized account information regarding the user so as to provide payment for the desired content. The movie-DBO, once it finds the desired content, may initiate the movie implementation-DBO to display the desired movie and the transaction-DBO to pay for the movie. In this instance, the user did not need to provide account information directly to the provider nor did the provider have to request particularized billing information. Instead, the transaction was handled through DBOs, that for instance, may verify sufficient funds exist to watch the movie and transfer those funds to the provider's account. It might be preferable to protect the privacy of the user by transferring these funds without even informing the provider who purchased the content, but only transfer the funds from account to account and then permit utilization of the content. For example, the user may provide an authentication interface dynamic base object that would furnish the content provider with the centralized information to be credited or debited.

Additionally, central authentication may be utilized with an encryption-DBO so as to permit decoding of the desired content once payment has been received. For example, a user may purchase a movie over the Internet. The content may be sent back to the user with an encryption-DBO and a transaction-DBO wherein the encryption-DBO is enabled once the transaction-DBO verifies that payment was received. The transaction-DBO may be centrally authenticated and verified, such as verifying that the account has sufficient funds or the like, and return the transaction-DBO result so as to enable decryption of the content.

Furthermore, central authentication may be combined with universal registration so that a DBO containing user registration and account information may be utilized to permit access to fee-bearing resources, and the like. Likewise, central authentication may contain the charges for all the resources used, from phone usage, movie rental, downloading books, songs, and the like. Each form of content or content requestor may contain a transaction-DBO that calls the central account and updates the account per usage by the user. Each business method may be unique per the providers requirements and still be utilized by the present invention.

Thus, there has been described an object driven software architecture and several process features which together provide for at least all of the advantages stated herein. Although the invention has been described with a certain degree of particularity, it should be recognized that elements thereof may be altered by persons skilled in the art without departing from the spirit and scope of the invention. It is believed that the central authentication system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for managing the inter action between a plurality of information appliances and a plurality of appliance services, said information appliances being removably connected to said appliance services through a network, the method comprising the steps of:

receiving, by an appliance service, an authentication interface dynamic base object including an appliance service request from an information appliance having an appliance type and an appliance identifier, said appliance service being a content provider;

verifying the authentication interface dynamic base object through a central authenticator by testing said request to determine whether said information appliance is registered, testing said request to determine whether said appliance identifier is authorized to receive a service from said appliance service and authorizing services for said information appliance from said appliance service;

wherein the central authenticator is used to at least one of certify that an account has sufficient funds or confirm an identity of a user; and wherein the authentication interface dynamic base object includes a transaction dynamic base object which is capable of being utilized to at least one of provide to or derive from a user's account financial data, the user's account residing on the central authenticator.

2. The method as described in claim 1, further comprising the step of collecting transaction information describing the services provided to said information appliance by said appliance service.

3. A method for managing the interaction between a plurality of information appliances and a plurality of appliance services, said information appliances being removably connected to said appliance services through a network, the method comprising the steps of:

receiving an authentication interface dynamic base object transmitted from a user information appliance by a content provider information appliance;

verifying the authentication interface dynamic base object through a central authenticator, wherein the authentication interface dynamic base object passes verification to an authentication implementation dynamic base object, the authentication implementation dynamic base object including user authentication information; and wherein the central authenticator is used to at least one of certify that an account has sufficient funds or confirm an identify of a user;

wherein the authentication interface dynamic base object includes a transaction dynamic base object; and wherein the transaction dynamic base object is capable of being utilized to at least one of provide to or derive from a user's account financial data, the user's account residing on the central authenticator.

4. The method as described in claim 3, wherein the authentication interface dynamic base object includes a registration dynamic base object, the registration dynamic base object capable of being utilized to provide registration information from a user's account residing on the central authenticator.

5. The method as described in claim 3, wherein the authentication implementation dynamic base object provides data to enable access by a user to the content provider without indicating to the content provider identity of the user.

6. The method as described in claim 3, wherein the central authenticator enables dynamic support of a plurality of payment methods.

7. The method as described in claim 3, wherein the authentication interface dynamic base object is encrypted.

8. The method as described in claim 3, wherein the user authentication information includes a credit card number and an expiration date of a credit card.

* * * * *